United States Patent
Moore

[11] 3,884,222
[45] May 20, 1975

[54] LARYNGOSCOPE

[76] Inventor: George Paul Moore, 2234 N.W. Sixth Pl., Gainesville, Fla. 32603

[22] Filed: Mar. 11, 1974

[21] Appl. No.: 449,821

[52] U.S. Cl.................... 128/11; 32/69; 350/96 B; 354/62
[51] Int. Cl................................. A61b 1/26
[58] Field of Search ............. 128/6, 10, 11, 21, 22, 128/23; 32/69; 350/96 B; 354/62

[56] References Cited
UNITED STATES PATENTS

| | | | |
|---|---|---|---|
| 1,211,073 | 1/1917 | Bugbee | 128/21 |
| 3,032,879 | 5/1962 | Lafitte | 32/69 |
| 3,534,729 | 10/1970 | Sakamoto | 128/6 |
| 3,812,505 | 5/1974 | Elliott | 354/62 |

FOREIGN PATENTS OR APPLICATIONS

| | | | |
|---|---|---|---|
| 420,594 | 2/1924 | Germany | 128/11 |

Primary Examiner—Richard A. Gaudet
Assistant Examiner—Henry S. Layton
Attorney, Agent, or Firm—Prangley, Dithmar, Vogel, Sandler & Stotland

[57] ABSTRACT

A laryngoscope and the like including a light-reflecting mirror shaped and arranged for insertion in relatively inaccessible cavities such as the pharynx and the like of a subject for reflecting light originating outside of the subject against a part in the cavity to be viewed, a handle connected to the mirror for holding it in the selected position, the mirror having a light-transmitting opening for transmission of light reflected from the mirror to the part to be viewed and back through the opening, a light collecting and directing system mounted adjacent to the opening receiving therethrough light transmitted from the part, and a coherent light-transmitting fiber optic bundle extending along the bundle and having a light receiving end disposed adjacent to the light collecting and directing system and having an exit end disposed outside of the subject for viewing by a user; when the handle is fixedly connected to the mirror, right-hand and left-hand forms are provided; alternatively, the connection is pivotal to permit adjustment therebetween; and there further is provided a binocular laryngoscope.

28 Claims, 17 Drawing Figures

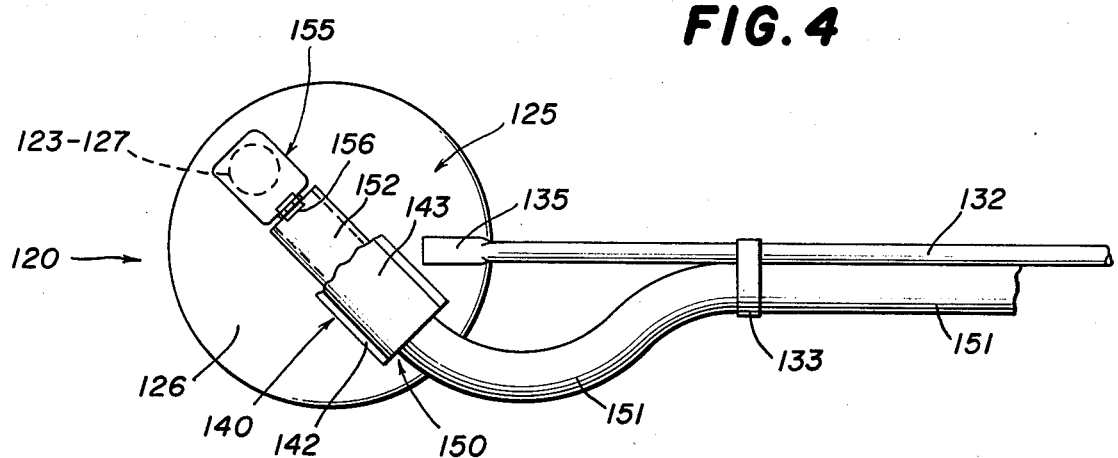
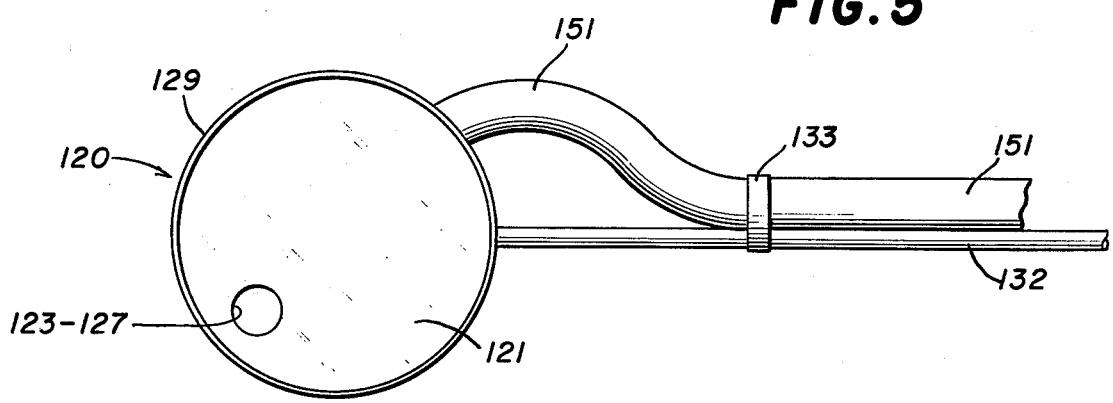
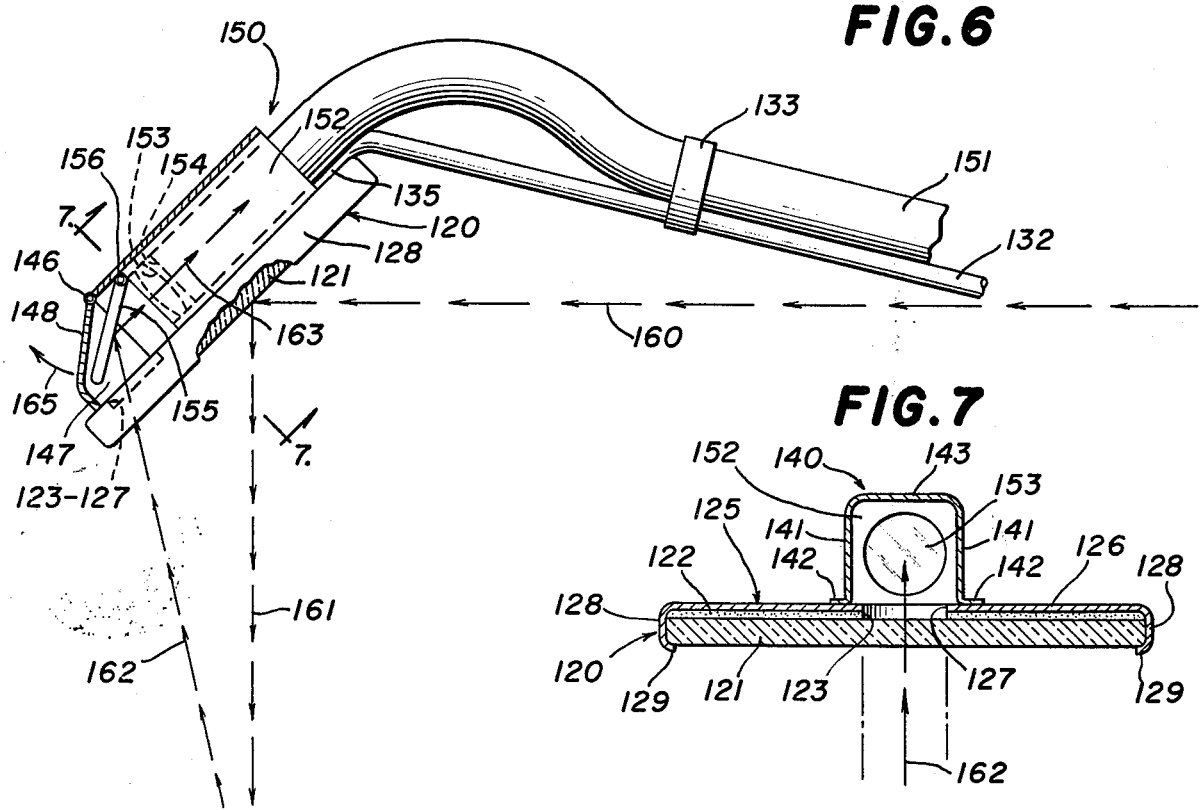

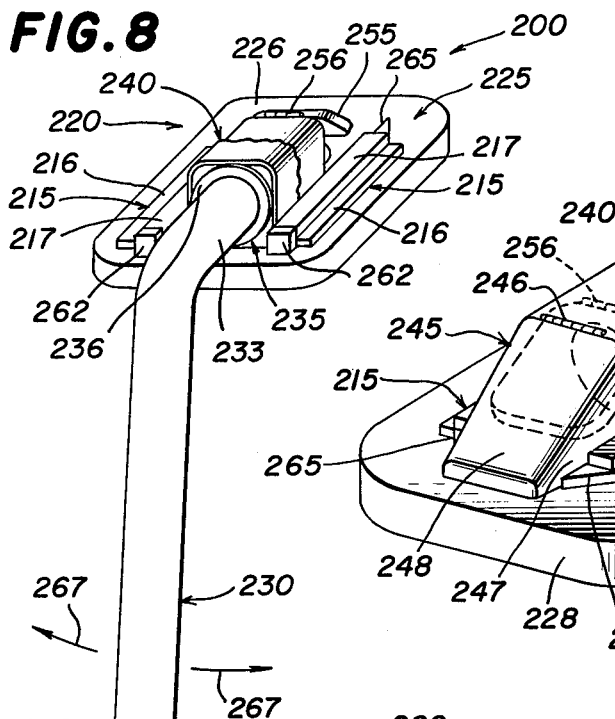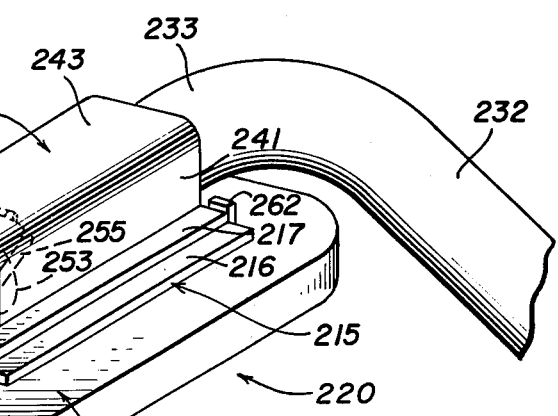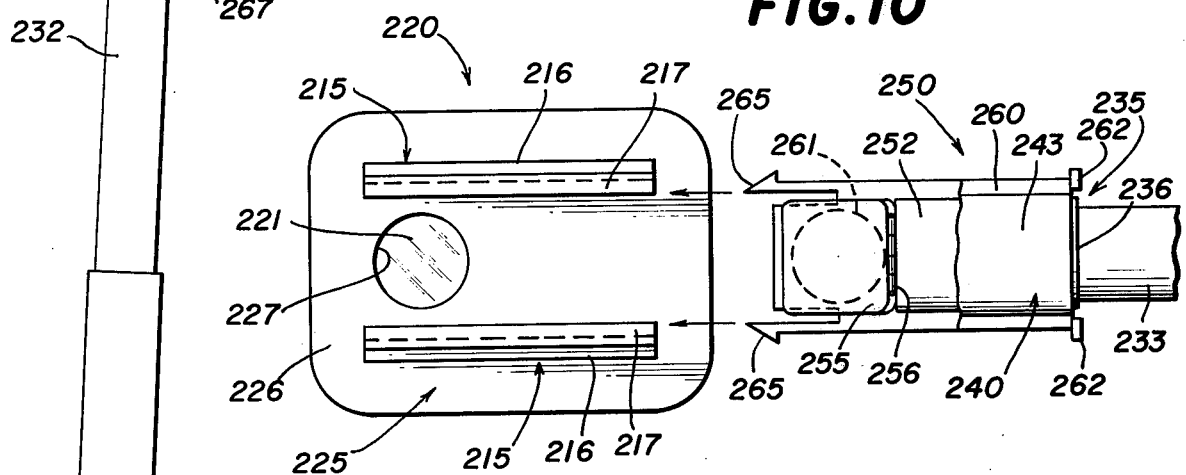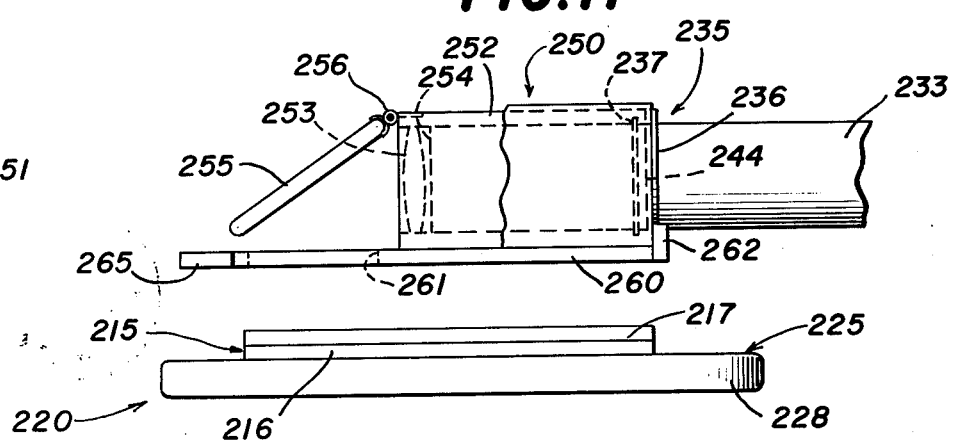

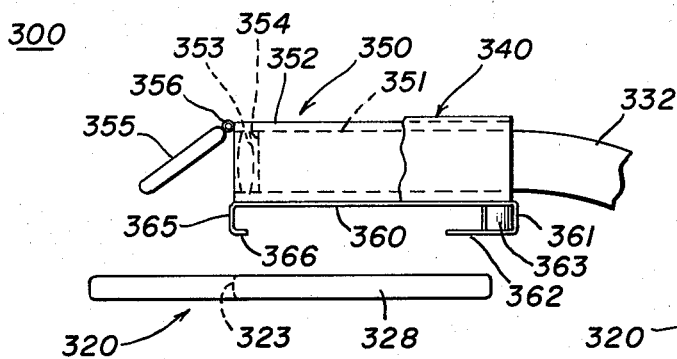
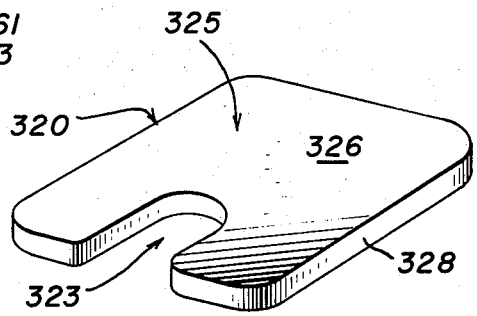
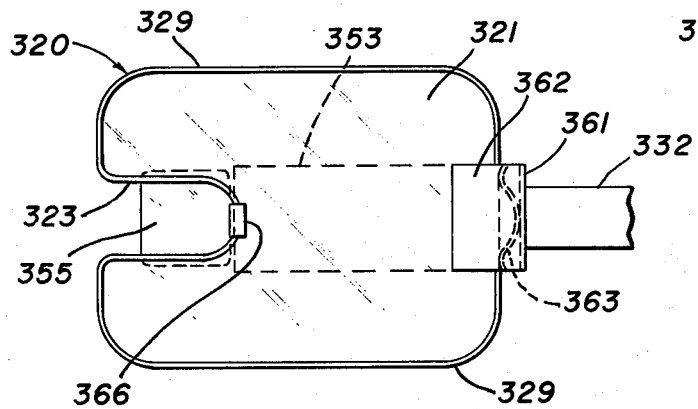
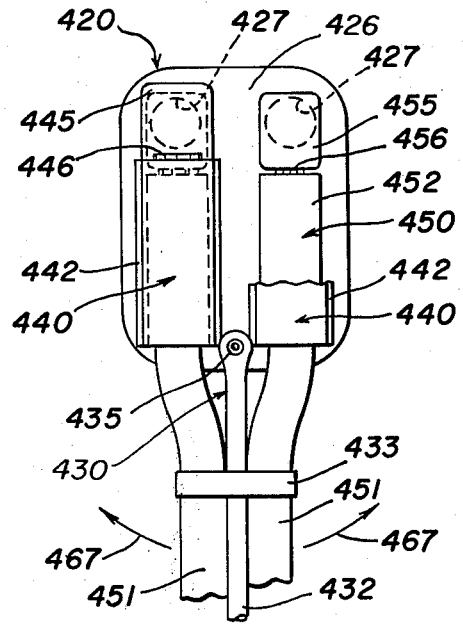
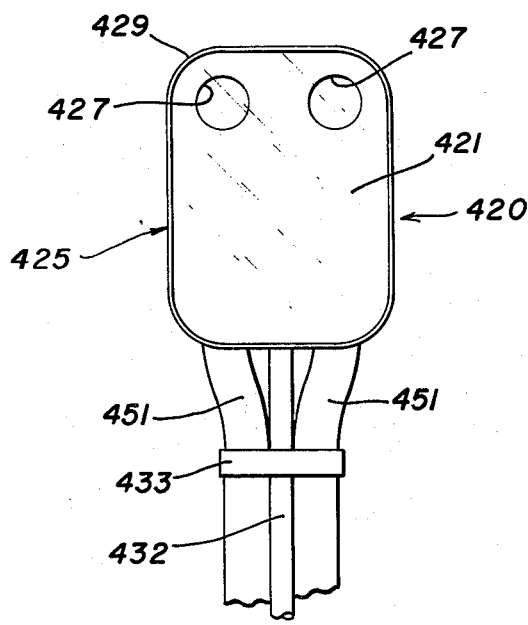
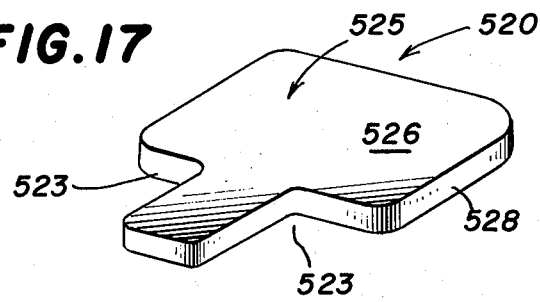

LARYNGOSCOPE

BACKGROUND OF THE INVENTION

The present invention relates generally to improvements in laryngoscopes, naso-laryngoscopes, endoscopes and the like useful in examining inaccessible cavities and structures such as the larynx, pharynx, naso-pharynx and the like.

There are available instruments incorporating therein fiber optic illumination combined with a coherent image transmitting fiber optic bundle for viewing and photographing. In such instruments, the amount of illumination available is limited by the size of the fiber optic bundle, which in turn is limited by the size of the cavity of the head, neck, and other parts of the body in which the instruments may be used. Use of such instruments also necessitates use of techniques and procedures that are not presently standard in the medical and related professions.

In other instruments available, fiber optic bundle illumination simply substitutes for and serves as a light source, whereas in yet other instruments, small lamps have been incorporated therein, see for example the Ferris et al., U.S. Pat. No. 3,090,379, all of which have proved to be unsatisfactory.

Most of the instruments available today do not permit stereoscopic examination, and those that do are unwieldy and require specific procedures, see for example the Sakamoto U.S. Pat. No. 3,534,729.

Because of the unsatisfactory quality of present instruments and the cameras associated therewith, practitioners depend upon verbal descriptions and sketches of laryngeal abnormalities and other pathologic conditions, which methods are highly inaccurate and unsatisfactory. Alternatively, laryngeal physiologists and others conducting laryngeal research are forced to use elaborate equipment which is not adapted for clinical use.

SUMMARY OF THE INVENTION

The present invention provides a laryngoscope and the like which permits the user to view the larynx and like structures from a position within the pharynx of the subject close to the laryngeal area, with a mirror that can direct any desired type and quantity of illumination onto the field of work to be viewed, all of which can be done using customary, standard procedures.

The area to be inspected can be photographed on black and white film or color film, as monocular or stereoscopic images, using still or motion photography; since the light source is external to the subject, it can be varied to supply whatever quantity and type of illumination is necessary to meet the photographic requirements, all utilizing an instrument that is small and inexpensive.

This is accomplished in the present invention, and it is an object of the present invention to accomplish these desired results, by providing a laryngoscope and the like that includes a light-reflecting mirror shaped and arranged for insertion in a relatively inaccessible cavity such as the larynx and the like of a subject for reflecting light originating outside of the subject apart from the cavity to be viewed, a handle connected to the mirror for holding the mirror in the selected position for directing light onto the part to be examined while the handle is held exteriorly of the subject, the mirror having a light-transmitting opening therein for transmission of light reflected from the mirror onto the part to be viewed and back through the opening, a light collecting and directing system mounted adjacent to the opening for receiving therethrough light transmitted from the part, and a coherent light-transmitting fiber optic bundle extending along the handle and having a light-receiving end disposed adjacent to the light collecting and directing system and having an exit end disposed outside of the subject for viewing by a user.

Another object of the invention is to provide a laryngoscope and the like of the type set forth wherein the handle is fixedly connected to the mirror with the opening therein in alignment with the optical axis of the light-receiving end of the optic bundle that is in turn inclined with respect to the longitudinal axis of the handle thereby to place the optical axis in the median sagittal plane of the subject, left-hand and right-hand versions being provided.

Yet another object of the invention is to provide a laryngoscope and the like of the type set forth wherein the handle is pivotally connected to the mirror so that the mirror and handle can be adjusted relative to each other to obtain the proper angularity of the mirror for optimum results.

Still another object of the invention is to provide a laryngoscope of the type set forth wherein the fiber optic bundle and the light collecting and directing system are mounted in a housing, and mounting means is provided to mount a mirror on the housing.

A further object of the invention is to provide a laryngoscope of the type set forth which can provide stereoscopic images by incorporating two spaced apart light collecting and directing systems and associated fiber optic bundles on a single reflecting mirror.

Further features of the invention pertain to the particular arrangement of parts of the laryngoscope, whereby the above outlined and additional operating features thereof are attained.

The invention, both as to its organization and method of operation, together with further features and advantages thereof will best be understood with reference to the following specification taken in connection with the following drawings.

BRIEF DESCRIPTION OF THE DRAWINGS

FIG. 4 is an enlarged fragmentary plan view of the rear of the mirror of the laryngoscope of FIG. 2;

FIG. 5 is a view similar to FIG. 4 illustrating the front or reflecting side of the mirror of the laryngoscope of FIG. 2;

FIG. 6 is a view of the laryngoscope of FIGS. 4 and 5 as seen from the side, certain additional parts being broken away;

FIG. 7 is a further enlarged view in section along the line 7—7 of FIG. 6;

FIG. 8 is a perspective view of a second preferred embodiment of a laryngoscope made in accordance with and embodying the principles of the present invention;

FIG. 9 is an enlarged perspective view of the mirror and associated parts of the laryngoscope of FIG. 8;

FIG. 10 is a plan view showing the method of assembly and disassembly of the fiber optic bundle and associated parts with the main reflecting mirror;

FIG. 11 is a side elevational view with the parts separated similar to FIG. 10;

FIG. 12 is a view of a third preferred embodiment of a laryngoscope of the present invention showing a different form of mirror associated with the fiber optic bundle, and a different method of assembling the mirror to the fiber optic bundle;

FIG. 13 is a plan view from the light reflecting side of the mirror of the laryngoscope of FIG. 12;

FIG. 14 is a perspective view of the main reflecting mirror forming a part of the laryngoscope of FIGS. 12 and 13;

FIG. 15 is a plan view of another preferred embodiment of the invention wherein two fiber optic bundles and two light collecting and directing systems are provided so as to afford a stereoptical view of objects being inspected;

FIG. 16 is a plan view of the laryngoscope of FIG. 15 as viewed from the light-reflecting side of the main reflecting mirror; and FIG. 17 is a perspective view of a modified form of the main reflecting mirror useful in a stereoscopic laryngoscope such as that illustrated in FIGS. 15 and 16.

DESCRIPTION OF THE PREFERRED EMBODIMENTS

Figure 1:
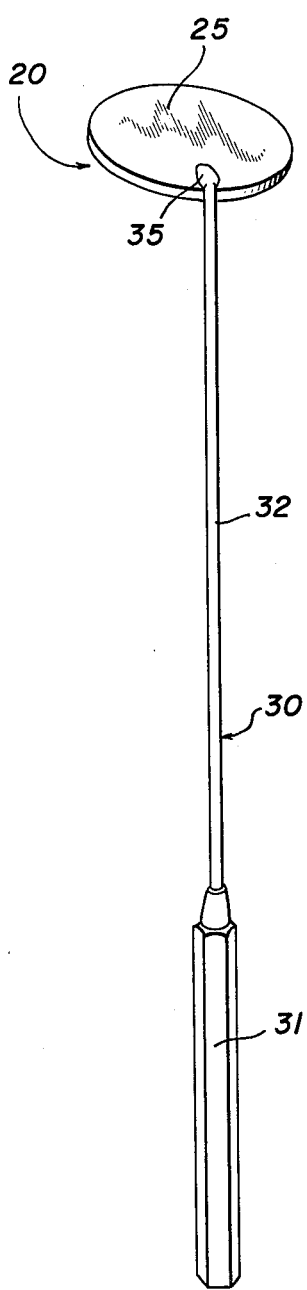
FIG. 1 is a perspective view of a laryngeal mirror which is presently used for indirect examination of the larynx and like parts.
Figure 2:
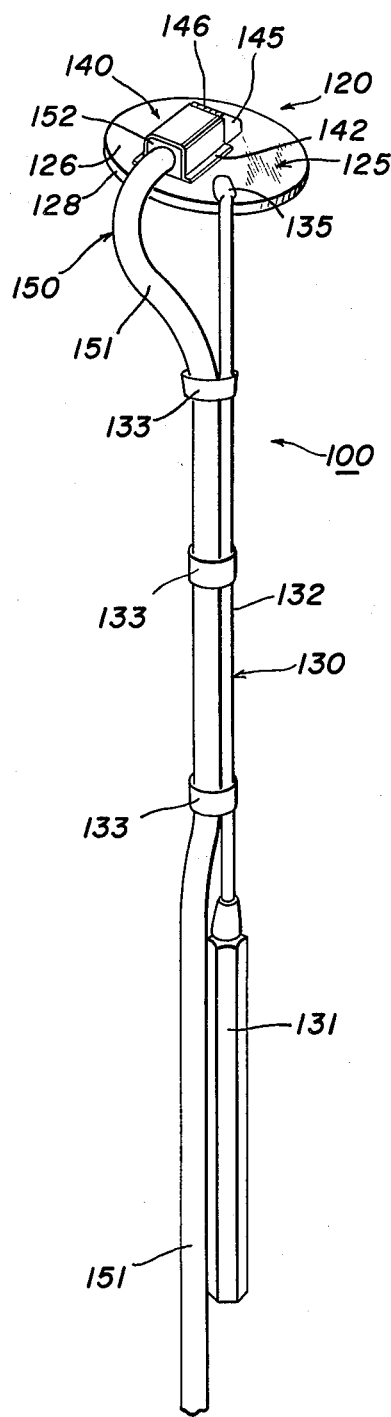
FIG. 2 is a perspective view of a first embodiment of a laryngoscope made in accordance with and embodying the principles of the present invention; a right-hand form being illustrated.

There is illustrated in FIG. 1 of the drawings a standard clinical mirror 20 commonly in use today by the medical and related professions for use in the indirect examination of the parts in interior areas and inaccessible cavities such as the larynx, pharynx, nasopharynx and mouth. The instrument is of the general type known as laryngoscopes or naso-laryngoscopes, or endoscopes and is used by laryngologists, physiologists, experimental phoneticians, dentists, and others.

The laryngeal mirror 20 in FIG. 1 is generally circular in shape and enclosed in a cover 25 supported by a handle generally designated by the numeral 30. As illustrated, the handle 30 has an outer grip portion 31 to be grasped by the user, a thinner portion or stem 32 to be extended into the mouth of the subject, and a rigid connection as at 35 to the mirror cover 25.

In carrying out a typical examination using current accepted procedures and practices, the right-handed examiner grasps the patient's protruded tongue with a gauze square held between the thumb and fingers of his left hand and places the mirror 20 in the pharynx of the subject, for example, with his right hand. The stem 32 of the laryngeal mirror 20 lies close to the left corner of the subject's mouth, which causes the connection 35 to be somewhat to the examiner's right of the median sagittal plane of the patient when the mirror 20 is in place, while the mirror 20 is located with one of its diameters in the median sagittal plane of the patient.

Referring to FIGS. 2 to 7 of the drawings there is illustrated the first preferred embodiment of a laryngoscope 100 made in accordance with and embodying the principles of the present invention, a right-hand monocular model having been illustrated in FIGS. 2 and 4 to 7. The laryngoscope 100 includes a mirror 120 on the end of a handle 130. The mirror 120 is circular in shape and is of a size to fit into a relatively inaccessible cavity such as the pharynx of a subject, and as is best illustrated in FIG. 7, includes a light-transmitting body 121, formed of glass for example, carrying on the rear surface thereof a light-reflecting layer 122 and all enclosed in a cover generally designated by the numeral 125. The cover 125 includes a plate 126 essentially covering the rear surface of the mirror 120 and having a side flange 128 extending all around and terminating in an inturned flange 129 that serves to hold the light-transmitting body 121 in the cover 125. For the purpose that will appear more clear hereinafter, the light reflecting layer 122 has an opening 123 therein in alignment with an opening 127 in the plate 126, whereby light may be transmitted through the body 121 and the aligned opening 123-127, the openings 123 and 127 being generally circular in outline as is best seen in FIG. 5.

The handle 130 has an outer grip portion 131 adapted to be held by the hand of a user, and a stem 132 extending from the grip portion 131 to a connection 135 fixedly secured to the rear of the cover 125 to mount the mirror 120 on the handle 130. Mounted on the rear of the cover 125 is a housing 140, the housing 140 including a pair of generally parallel side walls 141 carrying integral outturned side flanges 142 that are fixedly secured such as by soldering or welding to the adjacent surface of the plate 126. A top wall 143 is provided integral with the upper edges of the side walls 141 and carries on the forward edge thereof a front cover 145 secured thereto by means of a hinge 146. The front cover 145 includes a pair of generally triangular shaped side walls 147 and a top wall 148, the walls 147 and 148 being joined and cooperating to close the forward end of the housing 140. The front cover 145 is pivotal about the hinge 146 to provide access to the interior of the housing 140.

Forming a part of the laryngoscope 100 is a coherent fiber optic system 150, the principle components of which are a fiber optic bundle 151, a field lens 153 and a mirror 155. The fiber optic bundle 151 is coherent in character, i.e., it transmits essentially undistorted images from one end thereof to the other end thereof. The forward end of the fiber optic bundle 151 is generally designated as at 154 and is essentially planar. Disposed around the forward end 154 is a casing 152 having mounted therein the field lens 153 in the usual manner. Also mounted on the casing 152 is the mirror 155 secured thereto as by a hinge 156. Preferably the entire coherent fiber optic system 150 including the fiber optic bundle 151 in the casing 152, the field lens 153 and the mirror 155 is assembled as a unit and is insertable into the housing 140 as a unit and is likewise removable therefrom as a unit.

The parts are shown in FIGS. 6 and 7 with the coherent fiber optic system 150 within the housing 140. It will be seen that the mirror 155 is in alignment with the opening 123-127 in the rear of the mirror 120 and its cover 125 so as to receive light therethrough. Preferably the casing 152 is shaped and arranged neatly to fit within the housing 140 to be held firmly thereby. The fiber optic bundle 151 extends rearwardly out of the housing 140 and along the stem 132 of the handle 130, three bands 133 having been shown lightly securing the fiber optic bundle 151 to the stem 132. It will be understood that the other end (not shown) of the fiber optic bundle 151 extends to a point where it can be readily viewed by the user or is in position to transmit an image through a camera to a photographic film or to a television camera for most effective use of the image transmitted thereby.

Referring to FIGS. 6 and 7 of the drawings, further details of construction and the method of use of the laryngoscope 100 are shown. The longitudinal axis of the stem 132 is inclined with respect to the face of the light-transmitting body 121 of the mirror 120, and specifically makes an inclined angle of approximately 122° therewith. From FIG. 4 it will be seen that the longitudinal axis of the housing 140 is inclined with respect to the longitudinal axis of the stem 132 of the handle 130, the angle of inclination being approximately 45°. From the mirror 120, the light is reflected along the line 161 to the object to be viewed, and from there is reflected along two paths, one of the paths being along the lines 161 and 160 back to the eye of the examiner, and the other path being along the line 162 back through the opening 123–127 in the mirror 120 and to mirror 155 and from the mirror 155 into the fiber optic system 130, and more specifically through the field lens 153 and into the forward end 154 of the fiber optic bundle 151. The fiber optic system 150 accordingly receives the same image as that seen by the examiner, and the examiner can photograph what he sees at any time he wishes utilizing either a finger or foot controlled switch controlling a camera viewing the exit end of the fiber optic bundle 151.

The laryngoscope 100 permits any type and amount of illumination necessary into the cavity being examined along the line 160, whereby it is possible using the present instrument to insure adequate light at the point required. The illumination system may include a high intensity lamp for high speed motion picture photography of the vocal chords, for example, or a strobe lamp for stop motion photography, or other lamp suitable for other specific needs. Thus it is an important feature of the present instrument that the full amount and character of illumination required can be readily provided.

Another important feature of the invention is that the examiner can conduct his examination in the customary manner using standard accepted techniques, all with an instrument which is small in size and relatively inexpensive in cost.

In use, the laryngoscope 100, which is designed for the right-hand examiner, is inserted as described above with respect to the clinical mirror 20. More specifically, the examiner grasps the patient's protruded tongue with a gauze square held between the thumb and fingers of his left hand and places the mirror 120 in the pharynx of the subject, for example, with his right hand. The stem 132 lies close to the left corner of the subject's mouth, which causes the connection 135 to be somewhat to the examiner's right of the median sagittal plane of the patient when the mirror 120 is in place, while the mirror 120 is located with one of its diameters along which lies the longitudinal axis of the housing 140 in the median sagittal plane of the patient. A light source is located on the forehead of the examiner or near the side of the patient's head, from where the light is directed to a concave mirror worn over one eye by the examiner. The mirror reflects and concentrates the light into the mouth of the patient and onto the mirror 120, as is diagrammatically illustrated by the arrows along the line 160 in FIG. 6. This positioning permits the fiber optic system to obtain a symmetrical view of the area being examined, which would not be the case if the axis of the entrance end 154 of the bundle 151 lay along a diameter of the mirror 120 in alignment with the handle 130. The critical structure being viewed can be photographed in black and white or in color and can be photographed using either still photography or motion photography. The laryngoscope 100 will permit physicians, dentists, and others to keep an accurate record of the conditions and changes of parts being viewed and will allow those interested in research to obtain whatever photographs are desired.

The laryngoscope 100 is constructed with the mirror 120 of usual size, and may be, for example, of a diameter in the range from 0.75 inch to 1 inch. The mirror 120 instead of being circular in shape might be rectangular or square, although the circular shape is preferred. The housing 140 is illustrated with rounded corners to eliminate sharp edges that might prove uncomfortable to the subject being examined. The light reflecting layer 122 has been shown on the rear in the mirror 120, but it will be appreciated that the light reflecting surface could be on the front as well.

Figure 3:
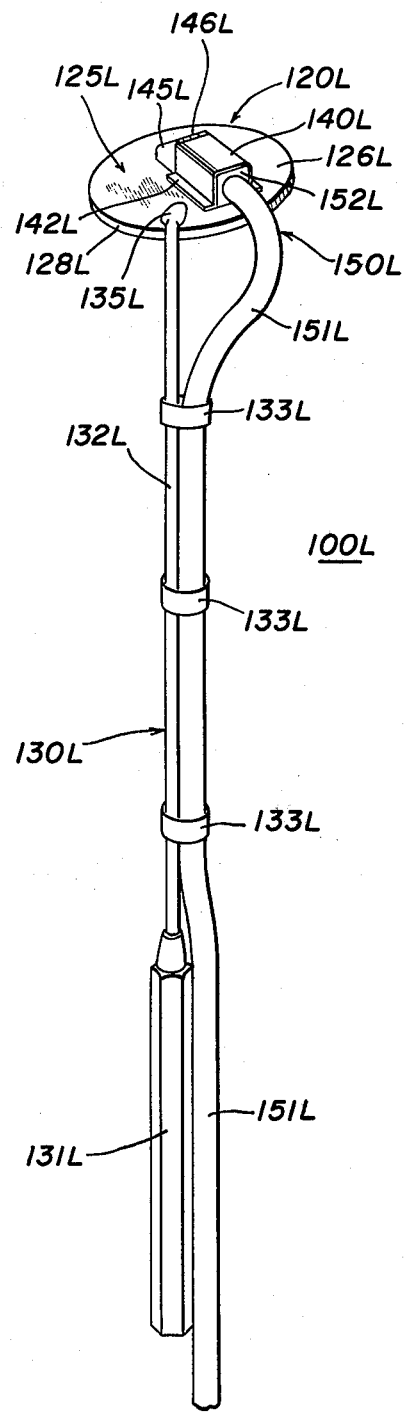
FIG. 3 is a view similar to FIG. 2 showing a laryngoscope of the left-hand form.

There is illustrated in FIG. 3 of the drawings a left-hand model of the laryngoscope, this form of the invention being identified by the numeral 100L. Like reference numerals have been applied to like parts in FIG. 3 as applied in FIG. 2 with the addition of the suffix L to indicate that this is an instrument designed for use in the left hand of the user. In all other respects except geometry, the laryngoscope 100L is identical to the laryngoscope 100 described in detail above.

Referring to FIGS. 8 to 11 of the drawings, there is illustrated a third embodiment of a laryngoscope 200 made in accordance with and embodying the principles of the present invention. The laryngoscope 200 includes a handle 230 in which is incorporated a coherent fiber optic system 250, the outer end of the handle 230 carrying a housing 240 to which is detachably mounted a mirror 220. In this form of invention, the mirror 220 is illustrated as being rectangular in shape with rounded corners and is of a size to fit in a relatively inaccessible cavity such as the pharynx of a subject. For ease of construction, the mirror 220 has a light-transmitting body 221 on the back of which is a light-reflecting layer having an opening therein, the light-transmitting body 221 being enclosed in a cover 225 including a plate 226 with a circular opening 227 therein and having side flanges 228 extending all around. It will be appreciated that the opening 227 is transparent to light and permits ready passage thereof therethrough. Mounted on the plate 226 is a pair of parallel tracks 215, each track 215 including a mounting flange 216 secured to the plate 226 and a retaining flange 217 spaced from and overlying an adjacent portion of the plate 226.

The handle 230 has an outer grip portion 231 adapted to be held by the hand of a user from which extends a stem 232, the stem 232 terminating in a short portion 233 which is inclined at an angle of approximately 120° with respect to the stem 232. Rotatably mounted on the outer end of the stem portion 233 is a housing generally designated by the numeral 240, the housing 240 being generally rectangular in cross section and including a pair of side walls 241, a top wall 243 and a mounting plate 260 closing the bottom of the housing 240. The rear of the housing 240 is closed by a rear wall 244 having a circular opening therein large enough to receive the forward end of the stem portion 233, two parallel rings 236 and 237 being provided frictionally and releasably to interconnect the stem portion 233 and the housing 240. The forward end of the housing 240 carries a front cover 245 secured to the top wall 243 by means of a hinge 246, the front cover 245 including a pair of generally parallel triangularly shaped side walls 247 and a top wall 248.

Carried by the stem portion 233 and disposed within the housing 240 is a coherent fiber optic system 250, the components of which are a fiber optic bundle 251, a field lens 253 and a mirror 255. The forward end of the fiber optic bundle 251 is generally designated 254 and is essentially planar and has disposed therearound a casing 252 in which is mounted the field lens 253 in the usual manner. Also mounted on the casing 252 is the mirror 255 secured thereto by a hinge 256. Preferably, the entire coherent fiber optic system 250 including the bundle 251, the casing 252, the field lens 253 and the mirror 255 is assembled as a unit and is insertable into the housing 240 as a unit and is likewise removable therefrom as a unit. The fiber optic bundle 251 extends rearwardly with respect to the housing 240 and into the stem portion 233 and through the remainder of the handle 230. The other end (not shown) of the fiber optic bundle 251 extends to a point where it can be readily viewed by a user or where it is in position to transmit an image to a photographic camera or to a television camera for the more effective use of the image transmitted thereby.

The structure for mounting the mirror 220 on the housing 240 will now be described. The mounting plate 260 essentially extends the length of the housing 240 and has a circular opening 261 therein that is adapted to be placed in alignment with the opening 227 in the cover 225 on the mirror 220. The forward edge of the mounting plate 260 carries a pair of hooks 265 which can be resiliently depressed inwardly toward each other so as to fit within the rails 215, and thereafter spring outwardly to a locking position illustrated in FIG. 9. The rear of the mounting plate 260 also carries a pair of abutments 262 that engage the tracks 215 to limit the forward movement of the housing 240 with respect to the mirror 220. The housing 240 can be quickly attached to the mirror 220 by positioning the parts as illustrated in FIG. 10 and moving the housing 240 to the left with respect to the mirror 220 in the direction of the arrows. The hooks 265 are pressed inwardly upon engagement with the tracks 215, the mounting plate 260 just fitting between the tracks 215. As soon as the parts get to the full forward mounted position illustrated in FIG. 1, the hooks 265 will automatically spring outwardly to engage over the adjacent end of the tracks 215, the abutment 262 now being adjacent to the other ends of the tracks 215. When it is desired to remove the mirror 220 from the housing 240, the hooks 265 are pressed inwardly toward each other to disengage the tracks 215, after which the mirror 220 can be removed from the housing 240.

The laryngoscope 200 can be adjusted for use by either a left-hand user or a right-hand user by simply twisting the mirror 220 with respect to the stem portion 233. More specifically, the rings 236–237 serve frictionally to engage the housing 240 so as to permit rotation and angular adjustment between the housing 240 and the stem portion 233, the parts being frictionally held in the adjusted position.

The use of the laryngoscope 200 is identical to that described above with respect to the laryngoscope 100. In a constructional example of the laryngoscope 200, the mirror 220 may have a size as small as 0.75 inch wide and 1 inch long or may have a size as large as 1 inch wide and 1.25 inches long. In an alternative construction of the mirror 200, it is formed of a light-transmitting material without a cover 225, the mirror being front surface reflecting and having the tracks 215 glued to the rear surface thereof.

There is illustrated in FIGS. 12 to 14 of the drawings a third form of laryngoscope 300 made in accordance with and embodying the principles of the present invention. The laryngoscope 300 is of the detachable mirror type like the laryngoscope 200, and certain details of construction and operation of the laryngoscope 300 are identical to the laryngoscope 200; accordingly, where appropriate, numerals in the 300 series have been applied to parts in FIGS. 12 to 14 that correspond in structure and function to like parts numbered in the 200 series in FIGS. 8 to 11.

Referring first to the mirror 320, it differs from the mirror 220 in that instead of having an opening 227 through which light passes, a cutout or slot 323 is provided. The mounting plate 360 has a downwardly extending rear flange 361 at the rear end thereof that carries a forwardly extending lower flange 362, the mirror 320 being receivable between the mounting plate 360 and the lower flange 362. The front edge of the mounting plate 360 terminates adjacent to the front edge of the casing 352, and carries a downwardly extending hook including a front flange 365 and a rearwardly extending retaining flange 366. The flange 366 is spaced from the mounting plate 360 a distance to receive the mirror 320 therebetween with the front plate 365 disposed in the cutout 323. The mirror 320 can be mounted upon the mounting plate 360 by inserting the rear edge of the mirror 320 between the mounting plate 360 and the lower flange 362 and pressing rearwardly against a spring 363 on the flange 361 until the free edge of the retaining flange 366 clears the edge of the cutout 323, at which time the mirror 320 can be moved upwardly against the mounting plate 360, and upon release of the mirror 320, the spring 363 moves the parts to the positions illustrated in FIG. 13 and releasably holds them in that position.

Referring to FIGS. 15 and 16 of the drawings, there is illustrated a binocular laryngoscope 400 made in accordance with and embodying the principles of the present invention. As illustrated, the laryngoscope 400 includes a mirror 420, a handle 430, two spaced-apart parallel housings 440 each containing a coherent fiber optic system 450. The mirror 420 has been illustrated as being generally rectangular in shape with rounded corners and is of a size to fit in a relatively inaccessible cavity such as the pharynx of a subject. For ease of construction, the mirror 420 has a light-transmitting body 421 on the back of which is a light-reflecting layer having two spaced-apart openings therein, the light-transmitting body 421 being enclosed in a cover 425 including a plate 426 with two circular openings 427 therein in alignment with the two openings in the light-reflecting layer, and having side flanges extending therearound and terminating in an inturned flange 429 holding the light-transmitting body 421 in the cover 425. It will be appreciated that the openings 427 are transparent to light and permit ready passage thereof therethrough.

The handle 430 is pivotally connected to the cover 425 adjacent to one end thereon and generally centrally thereof on one of the shorter edges thereof as at 435, the handle 430 including a stem 432 of a small size extending outwardly to a larger grip portion (not shown). The stem 432 is bent at an angle of approximately 120° with respect to the plane of the mirror 420 to provide the general angular relation between the longitudinal axis of handle 430 and the mirror 420 that is seen for like parts in FIG. 6 of the drawings of the laryngoscope 100.

Mounted on the rear of the mirror 420 and secured to the plate 426 of the cover 425 are two housings 440 arranged with the longitudinal axis thereof generally parallel to each other and parallel to the longer sides of the mirror 420. Each housing 440 includes a pair of generally parallel side walls carrying integral outturned side flanges 441 that are fixedly secured such as by soldering or welding to the adjacent surface of the plate 426. The side walls are joined by a top wall which carries on the forward edge thereof a front cover 445 secured thereto by means of a hinge 446. The front covers 445 close the forward ends of the respective housings 440 but are pivotal about the hinges 446 to provide access to the interiors of the housings 440.

Each of the coherent fiber optic systems 450 includes a fiber optic bundle 451, a field lens (not shown) and a mirror 455. The fiber optic bundles 451 are coherent in character, i.e., they transmit substantially undistorted images from one end thereof to the other end thereof. The forward end of each of the fiber optic bundles 451 is essentially planar and is disposed toward the upper end of the associated housing 440 as viewed in FIG. 15 and is enclosed in a casing 452. The casing 452 has mounted therein the field lens (not shown) in the usual manner and also carries the mirror 455 that is secured thereto as by a hinge 456. Each of the coherent fiber optic systems 450 is assembled as a unit and is insertable in the associated housing 440 as a unit and is likewise removable from the associated housing 440 as a unit.

When the coherent fiber optic systems 450 are inserted in the associated housing 440, the mirrors 455 thereof are in alignment with the openings 427 in the rear of the mirror 420 so as to receive light therethrough. The casings 452 are shaped and arranged neatly to fit within the associated housings 440 to be held firmly thereby. Each of the fiber optic bundles 451 extends rearwardly out of the associated housing 440 and along the stem 432 of the handle 430, a series of bands 433 having been provided lightly connecting the fiber optic bundles 451 to the stem 432. It will be understood that the other ends (not shown) of the fiber optic bundles 451 extend to a point where they can be readily viewed by the user or to a position to transmit an image through a camera to a photographic film or to a television camera for most effective use of the image transmitted thereby.

The two fiber optic systems 450 of FIGS. 15 and 16 operate in the same manner as the fiber optic system 150 described above with respect to FIGS. 2 to 7, and the laryngoscope 400 is generally utilized in the same manner as the laryngoscope 200 described above with respect to FIGS. 8 to 11. More specifically, the laryngoscope 400 can be adjusted for use by either a left-hand user or a right-hand user by simply shifting the mirror 420 with respect to the handle 430 at the pivotal connection 435. In an alternative construction of the mirror, it is formed of a light-transmitting material without a cover 425, the mirror being front surface reflecting and having the housings 440 glued to the rear surface thereof.

There is illustrated in FIG. 17 of the drawings a further form of laryngoscope mirror 520 which is to be used in a laryngoscope of the detachable mirror type like the laryngoscopes 200 and 300 described above, but is provided with two cutouts or slots 523 to accommodate binocular systems such as that of FIGS. 15 and 16 utilizing two coherent fiber optic systems.

While there have been described what are at present considered to be certain preferred embodiments of the invention, it will be appreciated that certain changes and modifications may be made therein without departing from the spirit and scope thereof. It is intended to cover in the appended claims all such changes and modifications as fall within the true spirit and scope of the invention.

What is claimed is:

1. A laryngoscope and the like comprising a light-reflecting mirror shaped and arranged for insertion in a relatively inaccessible cavity such as the pharynx and the like of a subject for reflecting light originating outside of the subject against a part in the cavity to be viewed, a handle connected to said mirror for holding said mirror in the selected position for directing light onto the part to be examined while the handle is held exteriorly of the subject, said mirror having a light-transmitting opening therein for transmission of light reflected from said mirror onto the part to be viewed and back through said opening, a light collecting and directing system mounted adjacent to said opening for receiving therethrough light transmitted from the part, and a coherent light-transmitting fiber optic bundle extending along said handle and having a light-receiving end disposed adjacent to said light collecting and directing system and having an exit end disposed outside of the subject for viewing by a user.

2. The laryngoscope and the like set forth in claim 1, wherein said mirror includes a light-transmitting body having a light-reflecting layer on one surface thereof, and said light-transmitting opening is an opening in said light-reflecting layer.

3. The laryngoscope and the like set forth in claim 1, wherein said light-transmitting opening is a physical cutout in said mirror.

4. The laryngoscope and the like set forth in claim 1, wherein said light collecting and directing system includes a field lens fixedly mounted adjacent to the light-receiving end of said optic bundle, and a second light-reflecting mirror in alignment with said light-transmitting opening for directing light transmitted therethrough onto said field lens.

5. The laryngoscope and the like set forth in claim 4, wherein said second mirror is hingedly mounted with respect to said field lens for changing the inclination of said second mirror to the optical axis of said field lens.

6. The laryngoscope and the like set forth in claim 1, wherein said fiber optic bundle lies along and is secured to said handle.

7. The laryngoscope and the like set forth in claim 1, wherein said fiber optic bundle extends through said handle.

8. The laryngoscope and the like set forth in claim 1, and further including a housing mounted on the rear of said mirror, said light directing system and said fiber optic bundle being assembled as a unit and insertable into said housing and removable from said housing.

9. The laryngoscope and the like set forth in claim 8, wherein said housing has a movable part thereon to permit access to said light collecting and directing system for adjusting the same.

10. The laryngoscope and the like set forth in claim 1, wherein said light collecting and directing system and said fiber optic bundle are mounted as a unit in a housing pivotal with respect to said handle, and said housing is selectively attachable to said mirror to place said light collecting and directing system in registration with the opening in said mirror.

11. A laryngoscope and the like comprising a light reflecting mirror shaped and arranged for insertion in a relatively inaccessible cavity such as the pharnyx and the like of a subject for reflecting light originating outside of the subject against a part in the cavity to be viewed, a handle fixedly connected to said mirror for holding said mirror in the selected position for directing light onto the part to be examined while the handle is held exteriorly of the subject, said mirror having a light-transmitting opening therein for transmission of light reflected from said mirror onto the part to be viewed and back through said opening, a light collecting and directing system mounted adjacent to said opening for receiving light transmitted from the part therethrough, and a coherent light-transmitting fiber optic bundle extending along said handle and having a light-receiving end disposed adjacent to said light collecting and directing system and having an exit end disposed outside of the subject for viewing by a user, said light-transmitting opening being in alignment with the optical axis of the light-receiving end of said optic bundle and the optical axis of the light-receiving end of said optic bundle being inclined with respect to the longitudinal axis of said handle, thereby to place the optical axis of the light-receiving end of said optic bundle in the median sagittal plane of the subject when the mirror is placed in the pharnyx, and the like.

12. The laryngoscope and the like set forth in claim 11, said light-transmitting opening is disposed to the left of the longitudinal axis of said handle when viewed from the light-reflecting side of said mirror.

13. The laryngoscope and the like set forth in claim 11, said light-transmitting opening is disposed to the right of the longitudinal axis of said handle when viewed from the light-reflecting side of said mirror.

14. The laryngoscope and the like set forth in claim 11, wherein the longitudinal axis of said handle makes an angle of approximately 120° with respect to the light-reflecting surface of said mirror.

15. The laryngoscope and the like set forth in claim 11, wherein the optical axis of the light-receiving end of said optic bundle is inclined at an angle of approximately 45° with respect to the longitudinal axis of said handle.

16. The laryngoscope and the like set forth in claim 11, and further comprising a housing mounted on the rear of said mirror for receiving said light collecting and directing system and the light-receiving end of said fiber optic bundle therein, said light collecting and directing system including a field lens fixedly mounted adjacent to the light-receiving end of said fiber optic bundle, and a second light-receiving and light-reflecting mirror in alignment with said light-transmitting opening for directing light transmitted therethrough onto said field lens, said second mirror being hingedly mounted with respect to said field lens for changing the inclination of said second mirror to the optical axis of said field lens, said housing including a hinged part overlying said light-transmitting opening for movement to a position for adjusting the position of said second mirror.

17. A laryngoscope and the like comprising a light reflecting mirror shaped and arranged for insertion in a relatively inaccessible cavity such as the pharnyx and the like of a subject for reflecting light originating outside of the subject against a part in the cavity to be viewed, a handle pivotally connected to said mirror for holding said mirror in the selected position for directing light onto the part to be examined while the handle is held exteriorly of the subject, means frictionally interconnecting said mirror and said handle to hold said mirror at the adjusted position with respect to said handle, said mirror having a light-transmitting opening therein for transmission of light reflected from said mirror onto the part to be viewed and back through said opening, a light collecting and directing system mounted adjacent to said opening for receiving light transmitted from the part therethrough, and a coherent light-transmitting fiber optic bundle extending along said handle and having a light-receiving end disposed adjacent to said light collecting and directing system and having an exit end disposed outside of the subject for viewing by a user.

18. The laryngoscope and the like set forth in claim 17, wherein said fiber optic bundle extends through said handle and has the optical axis of the light-receiving end thereon in alignment with said light-transmitting opening.

19. A laryngoscope and the like comprising a light-reflecting mirror shaped and arranged for insertion in a relatively inaccessible cavity such as in the pharnyx and the like of a subject for reflecting light originating outside of the subject against a part in the cavity to be viewed, said mirror having a light-transmitting opening therein for transmission of light reflected from said mirror onto the part to be viewed and back through said opening, a handle having a housing pivotally connected thereto and including means frictionally interconnecting said housing and said handle to hold the housing at an adjusted position with respect to said handle, mounting means on said mirror and said housing for mounting said mirror on said housing with said opening in alignment with said housing, a light collecting and directing system mounted in said housing for registration with said opening, and a coherent light-transmitting fiber optic bundle extending along said handle and having a light-receiving end disposed adjacent to said light-collecting and directing system in said housing and having an exit end disposed outside of the subject for viewing by a user.

20. The laryngoscope and the like set forth in claim 19, wherein said mounting means includes a pair of spaced apart tracks on the rear of said mirror and cooperating guides on said housing, and manually releasable latch means for holding said tracks and said guides in the assembled condition.

21. The laryngoscope and the like set forth in claim 19, wherein said housing has a portion thereof pivotally mounted thereon for movement to permit access by a user to said light collecting and directing system for manual adjustment thereof.

22. The laryngoscope and the like set forth in claim 19, wherein said mounting means includes spaced apart hooks on said housing engaging said mirror to interconnect the same.

23. A laryngoscope and the like comprising a light-reflecting mirror shaped and arranged for insertion in a relatively inaccessible cavity such as the pharynx and the like of a subject for reflecting light originating outside of the subject against a part in the cavity to be viewed, a handle connected to said mirror for holding said mirror in the selected position for directing light onto the part to be examined while the handle is held exteriorly of the subject, said mirror having two spaced apart light-transmitting openings therein for transmission of light reflected from said mirror onto the part to be reviewed and back through said openings, two light collecting and directing systems respectively mounted adjacent to said openings for receiving respectively therethrough light transmitted from the part, and two coherent light-transmitting fiber optic bundles respectively having a light-receiving end disposed adjacent to an associated one of said light collecting and directing systems, each of said fiber optic bundles having an exit and disposed outside of the subject for viewing by the user to provide a stereoscopic view of the part.

24. The laryngoscope and the like set forth in claim 23, wherein said mirror includes a light-transmitting body having a light-reflecting layer on one surface thereof, and said light-transmitting openings are openings in said light-reflecting layer.

25. The laryngoscope and the like set forth in claim 23, wherein said light-transmitting openings are physical cutouts in said mirror.

26. The laryngoscope and the like set forth in claim 23, and further comprising two housings mounted on the rear of said mirror respectively in registration with said openings therein, said light collecting and directing systems and said fiber optic bundles being assembled respectively as units and insertable respectively into said housing and removable therefrom.

27. The laryngoscope and the like set forth in claim 26, wherein each of said housings has a movable part thereon to permit access to the associated light collecting and directing system for adjusting the same.

28. The laryngoscope and the like set forth in claim 23, wherein said handle is pivotally connected to said mirror to permit adjustment of the angularity therebetween.

* * * * *